United States Patent [19]

Fuxe

[11] 3,883,655

[45] May 13, 1975

[54] ERGOCORNINE OR 2-BROMO-α-ERGOCYPTINE IN THE TREATMENT OF PARKINSONISM

[75] Inventor: Kjell Fuxe, Stockholm, Sweden

[73] Assignee: Sandoz Ltd., Basel, Switzerland

[22] Filed: Oct. 11, 1973

[21] Appl. No.: 405,463

[52] U.S. Cl............................ 424/261; 424/262
[51] Int. Cl............................... A61k 27/00
[58] Field of Search........................ 424/261, 262

[56] References Cited
OTHER PUBLICATIONS
Chem. Abst., 75-74416k (1971).
Chem. Abst., 69-24936k (1968).

*Primary Examiner*—Stanley J. Friedman
*Attorney, Agent, or Firm*—Gerald D. Sharkin; Robert S. Honor; Thomas O. McGovern

[57] ABSTRACT

This invention concerns a novel therapeutic use of ergocornine and 2-bromo-α-ergocryptine for the treatment of Parkinson's disease.

5 Claims, No Drawings

ERGOCORNINE OR 2-BROMO-α-ERGOCYPTINE IN THE TREATMENT OF PARKINSONISM

IMPROVEMENTS IN OR RELATING TO ORGANIC COMPOUNDS

The present invention relates to a novel therapeutic use for the known pharmaceutical compounds ergocornine and 2-bromo-α-ergocryptine.

Ergocornine is known to exhibit the typical central and peripheral activity of ergot alkaloids, such as specific inhibiting effects on the sympathetic functions of the vegetative nervous system. 2-Bromo-α-ergocryptine is known to exhibit lactation-inhibiting activity.

It has now been found that ergocornine and 2-bromo-α-ergocryptine are useful as stimulating agents for the central dopamine receptors, and are therefore useful in the treatment of Parkinson's disease. The stimulation of dopamine receptors by ergocornine and 2-bromo-α-ergocryptine is indicated by tests with rats. In one test a unilateral lesion of the nigro-neostriatal dopamine pathway is performed by a 6-hydroxy-dopamine injection in the *Substantia nigra*. After 4 to 6 weeks ergocornine or 2-bromo-α-ergocryptine is injected i.p. at a dose of 0.25 to 10 mg/kg.

It is known that the so called "denervated" dopamine receptors show an increased sensitivity to the action of dopamine receptor stimulating agents. Therefore, after treatment with such dopamine receptor stimulating agents, the "denervated" side is activated more than the intact side. This activation is shown in that the rats turn in the direction of the intact side. In the indicated tests, ergocornine and 2-bromo-α-ergocryptine exhibit a more pronounced turning behaviour than apomorphine, a known dopamine receptor stimulating agent. Additionally the duration of the turning behaviour in the case of ergocornine and 2-bromo-α-ergocryptine is considerably longer than in the case of apomorphine, which duration is attributed to a prolonged stimulation of the dopamine receptors.

For the above mentioned use the dosage will, of course, vary depending on the compound employed, mode of administration and therapy desired. However, in general, satisfactory results are obtained when administered at a daily dosage of from about 0.004 to about 10, preferably from about 0.004 to about 0.3 in the case of the larger mammals, mg per kg animal body weight, conveniently given in divided doses 2 to 4 times a day or in sustained release form. For the larger mammals, the total daily dosage is in the range from about 0.3 to about 15 mg, and dosage forms suitable for oral administration comprise from about 0.1 mg to about 8 mg of the compounds admixed with a solid or liquid pharmaceutical carrier or diluent.

Ergocornine and 2-bromo-α-ergocryptine may be administered in pharmaceutically acceptable acid addition salt form. Such salt forms have the same order of activity as the free base forms and are readily prepared in conventional manner. Suitable acids for salt formation include hydrochloric, hydrobromic and sulphuric acids and maleic and tartaric acids, but preferably however methanesulphonic acid.

Ergocornine and 2-bromo-α-ergocryptine are conveniently administered in the form of pharmaceutical preparations. Such pharmaceutical preparations are known and may, for example, be in the form of tablets, powders, granulates, capsules, syrups and elixirs for oral administration, and in the form of solutions, suspensions, dispersions and emulsions for parenteral administration, e.g., a sterile injectable aqueous and/or oily suspension. Suitable preparations for oral administration may contain conventional adjuvants and carrier materials.

The preferred preparations from the standpoint of production and ease of administration are solid preparations, especially hard-filled capsules and tablets.

The following non-limitative Examples illustrate the invention.

EXAMPLE 1

2-Bromo-α-ergocryptine tablets

Tablets suitable for enteral administration and containing the following ingredients, may be produced in known manner. The tablets may be used in the treatment of Parkinson's disease at a dose of 3 × 1 tablet daily.

| Ingredients | Weight | | |
|---|---|---|---|
| 2-Bromo-α-ergocryptine methanesulphonate | 2.87 | mg | (corresponding to 2.5 mg of base) |
| Lactose | 96.18 | mg | |
| Maize starch | 14.00 | mg | |
| Polyvinyl pyrrolidone | 5.00 | mg | |
| Magnesium stearate | 0.70 | mg | |
| Talc | 1.20 | mg | |
| Colouring substances | 0.05 | mg | |
| | 120 | mg | |

EXAMPLE 2

2-Bromo-α-ergocryptine capsules

Capsules suitable for enteral administration and containing the following ingredients, may be produced in known manner. The capsules may be used in the treatment of Parkinson's disease at a dose of 3 × 1 capsule daily.

| Ingredients | Weight | | |
|---|---|---|---|
| 2-Bromo-α-ergocryptine methanesulphonate | 3.00 | mg | (corresponding to 2.61 mg of base) |
| Lactose | 105.00 | mg | |
| Maize starch | 20.00 | mg | |
| Talc | 4.50 | mg | |
| Erosil | 1.00 | mg | |
| Magnesium stearate | 1.50 | mg | |
| optionally colouring substances | | | |
| | 135 | mg | |

The active agent 2-bromo-α-ergocryptine may also be replaced by ergocornine in Examples 1 and 2. The 2.87 mg of ergocornine methanesulphonate used for the production of tablets correspond to 2.45 mg of base, and the 3.00 mg of ergocornine methanesulphonate used for the production of capsules correspond to 2.56 mg of base.

I claim:

1. A method of treating Parkinson's disease in an animal which comprises administering to an animal in need of such treatment a therapeutically effective dose for treating Parkinson's disease of ergocornine or 2- bromo-α-ergocyptine as active agent in free base form in pharmaceutically acceptable acid addition form thereof.

2. A method according to claim 1, in which the active agent is administered at a daily dose of from about 0.004 to about 10 mg/kg animal body weight.

3. A method according to claim 1, wherein the active agent is administered at a daily dose of from 0.3 to 15 mg.

4. A method according to claim 1, wherein the active agent is ergocornine.

5. A method according to claim 1, wherein the active agent is 2-bromo-α-ergocryptine.

* * * * *

Dedication 3,883,655.—*Kjell Fuxe*, Stockholm, Sweden. ERGOCORNINE OR 2-BROMO-α-ERGOCYPTINE IN THE TREATMENT OF PARKINSONISM. Patent dated May 13, 1975. Dedication filed Dec. 8, 1980, by the assignee, *Fidelity Union Trust Company*.

Hereby dedicates said patent to the Public.

[*Official Gazette February 17, 1981.*]